United States Patent Office 3,346,280
Patented Oct. 10, 1967

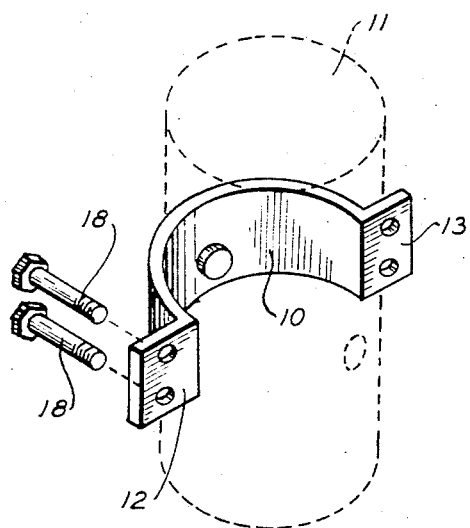
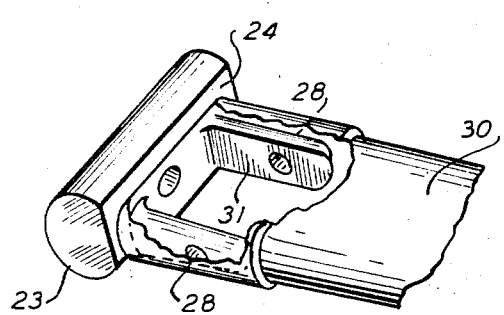
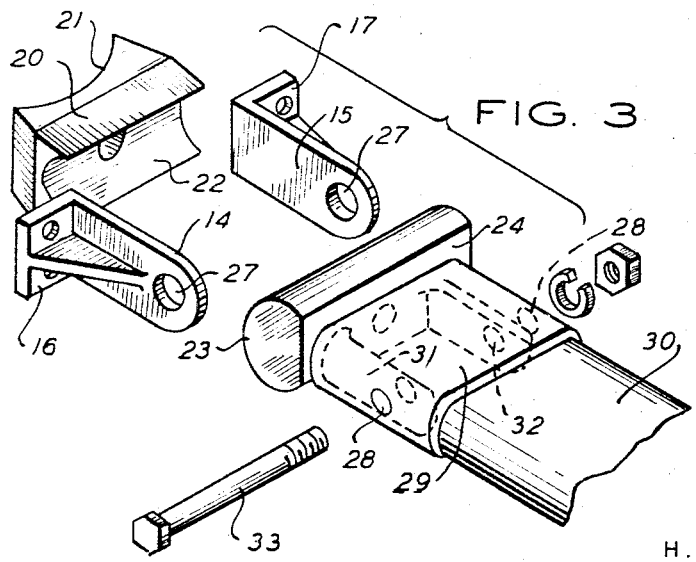

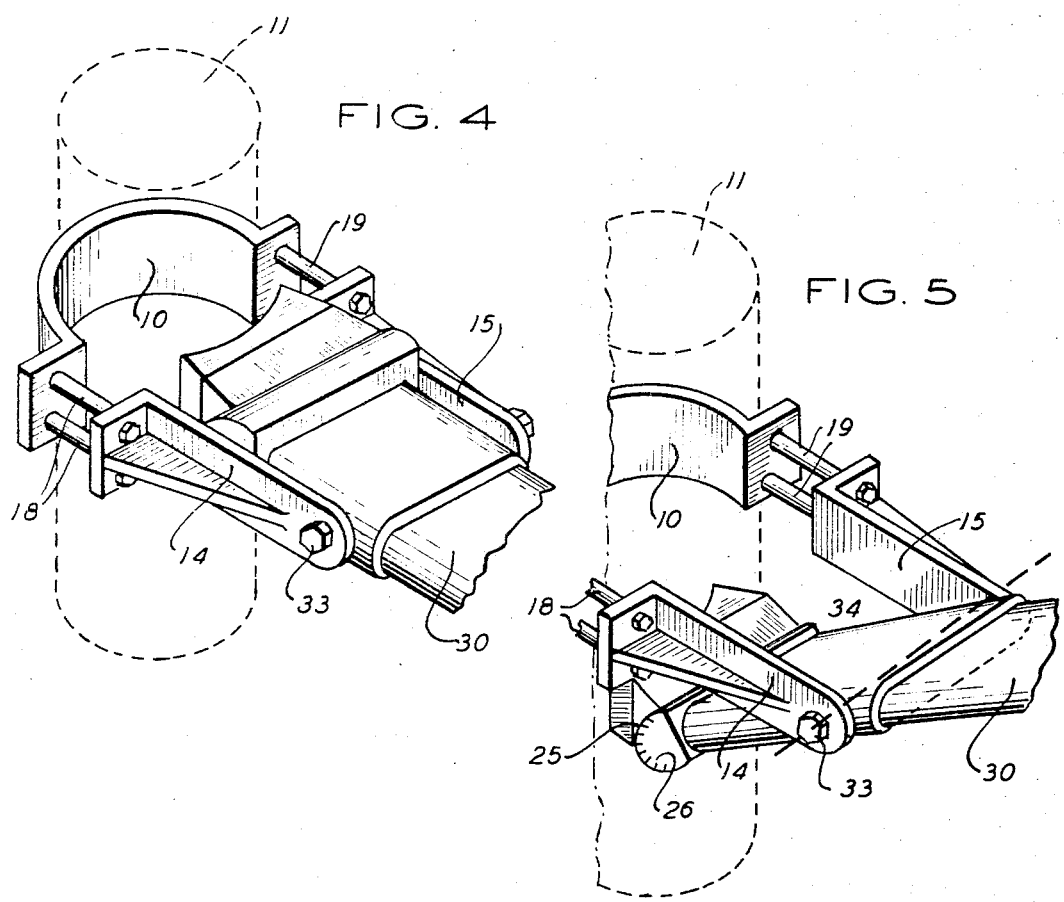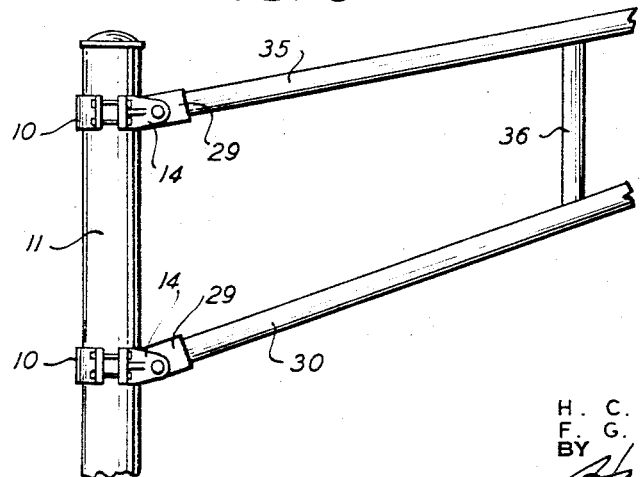

3,346,280
ADJUSTABLE MECHANISM FOR SECURING AN ARM TO A POST
Henry C. Pfaff, Jr., Summit, and Francis G. Schlosser, Ridgefield Park, N.J., assignors to Pfaff and Kendall, Newark, N.J., a corporation of New Jersey
Filed Aug. 12, 1965, Ser. No. 479,271
8 Claims. (Cl. 287—14)

This invention relates to devices for securing arms to posts, with particular reference to traffic lighting and control devices to be secured outwardly of and in spaced relation to the post proper.

Pursuant to the present invention, novel means are provided for adjustably securing one or more arms to a post at precisely the desired angle for light focusing, traffic control orienting or other purposes. The device is adapted to be made in standard form, readily adjustable in the field to the precise desired angular arrangement between the arm and the post, which may be altered from time to time as desired, the device being readily disassembled for repair, replacement or other purposes.

Pursuant to the invention novel means are thus provided for achieving a wide range of angular adjustment of an arm on a post, with the use of a minimum number of parts, while providing a sturdy and rugged structure for the purpose described.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a perspective view of a post, shown in dotted lines, and of a strap member shown, positioned thereon, pursuant to the invention, FIG. 2 is a perspective, partly broken view of a pivot member and arm secured thereto, pursuant to the invention, FIG. 3 is a fragmentary perspective exploded view of parts of the device of the invention, FIG. 4 is a perspective, partly fragmentary view of a device embodying the invention, shown intially securing an arm to a post, FIG. 5 is a similar view with the pivot member shown moved to dispose the arm at a desired angle relative to the post, and FIG. 6 is a fragmentary, side elevational view of a post with a pair of arms shown secured thereto in accordance with the invention.

As shown in the drawings, wherein similar reference characters indicate corresponding parts, the adjustable mechanism of this invention may comprise (FIG. 1) strap means 10 formed conforming to the contour of the post 11, with out-turned ends 12, 13 extending beyond the post. Elongated link means 14, 15 are provided, having corresponding out-turned ends 16, 17 and bolt or other means 18, 19 (FIG. 4) pass through the ends 12, 13, 14 and 15 of the strap and links, for drawing them together in a manner which will be apparent from a consideration of the drawings and the description herein. A saddle member 20 is provided having a face 21 conforming to the post contour for complementarily positioning the same on the post, and an opposite face 22 to be engaged by the complementarily formed portion 23 of pivot member 24. The saddle and pivot members 20, 24 may have complementary markings 25, 26 (FIG. 5) to facilitate moving the pivot member to precisely the desired angle relative to the saddle 20. The parts may be initially positioned as in FIG. 4, and then loosening the parts 20, 14, 15 and 10, the pivot member 24 rotated to the desired angular relation of the pivot member 24 to the saddle member 20, as, for example, in FIG. 5 as compared with FIG. 4.

Pursuant to the invention, means are provided for locking the pivot member 24 (and thus the arm) at the desired angular position on the post. By way of example, apertures 27 are shown provided in the links 14 and 15 and corresponding apertures 28 in pivot member 24 or its extended portion 29, which is formed to readily receive the end of the arm 30 therein. The arm 30 may be of any desired contour, the extension 29 of the pivot member 24 receiving the arm 30 in a friction press fit, or through the use of adhesives or securing liquids such as epoxy cement, or welding or by the use of bolt members or the like. The arm 30 may (FIG. 2) be positioned intermediate posts 31 secured to the pivot member 24 in spaced parallel relation to the sides of the extension 29 thereof and may be formed in any desired or convenient manner and provided with similar apertures 32. Pivot pin 33 (FIG. 3) may be passed through the apertures of the link member and of the extended portion 29 of the pivot member, thereby (FIG. 5) permitting the pivot member 24 to be rotated about the axis of the pivot pin 33.

The device is readily adaptable for securing (FIG. 6) a second arm 35 to post 11 in a corresponding fashion and in spaced relation to the first arm 30 where, for example, it is desired to mount more than one arm on the post separately, or in an assembly, with or without a connecting strip 36.

It will be understood from the disclosure herein that the face 21 of the saddle member 20 shown in FIG. 3 as concave to conform to the circular cross section of the post 11, may be formed relatively straight or of other contour, to conform to posts having contours other than circular.

While the foregoing disclosure of exemplary embodiments is made in accordance with the patent statutes, it is to be understood that the invention is not limited hereto or thereby, the inventive scope being defined in the appended claims.

We claim:

1. An adjustable mechanism for securing an arm to a post at a desired angle, comprising strap means adapted to be positioned on the post, elongated link means adjustably engaging the strap means at one end for connection therewith, a saddle member to be positioned against the post, a pivot member movably engaging the saddle member at one end, and engaging the arm at the opposite end, and means engaging the link means and the pivot member at a location axially offset from the axis of rotation of the pivot member for securing the pivot member and thus the arm to the post at the desired angle.

2. In an adjustable mechanism for securing an arm at a desired angle to a post as set forth in claim 1, said pivot member and link means having complementary apertures, and a pivot pin passing through said apertures for thereby connecting the pivot member for axial rotation on the pivot pin, to thereby adjust the angular disposition of the arm relative to the post.

3. In an adjustable mechanism for securing an arm to a post in a desired angle, as set forth in claim 1, registry means in the pivot member for positioning the arm in the pivot member.

4. In an adjustable mechanism for securing an arm to a post at a desired angle as set forth in claim 1, said link means and strap means having complementary interengaging means for adjustably connecting them and for thereby adjustably mounting the arm on the post.

5. In an adjustable mechanism for securing an arm to a post at a desired angle as set forth in claim 1, said pivot member and saddle having complementary surfaces for movably mounting the pivot member on the saddle.

6. In an adjustable mechanism for securing an arm to a post at a desired angle as set forth in claim 1, said saddle member conforming to the post contour for complementary positioning of the saddle member on the post.

7. In an adjustable mechanism for securing an arm to a post at a desired angle as set forth in claim 1, complementarily formed portions on said saddle member and pivot member for so movably mounting the pivot member on the saddle member.

8. In an adjustable mechanism for securing an arm to a post at a desired angle as set forth in claim 1, said saddle member having a face thereof conforming to the post contour ofr complementary positioning thereon and said saddle and pivot member having complementarily formed portions for so moving the pivot member on the saddle member.

References Cited

UNITED STATES PATENTS

| | | | |
|---|---|---|---|
| 1,843,454 | 2/1932 | Manson | 248—221 |
| 2,576,624 | 11/1951 | Miller | 248—221 |
| 2,608,369 | 8/1952 | Hocher | 248—221 |
| 2,966,324 | 12/1960 | Heinzen | 248—221 |
| 3,041,092 | 6/1962 | Eves et al. | 287—14 |
| 3,241,800 | 3/1966 | Richter | 248—221 |

CARL W. TOMLIN, *Primary Examiner.*

W. L. SHEDD, *Assistant Examiner.*